United States Patent
Kim et al.

(10) Patent No.: US 12,451,618 B2
(45) Date of Patent: Oct. 21, 2025

(54) ANTENNA ARRAY STRUCTURE INCLUDING STACKED AND INTERLEAVED ANTENNA ELEMENTS AND METHOD OF ARRANGING THE SAME

(71) Applicant: SAMSUNG ELECTRONICS CO., LTD., Suwon-si (KR)

(72) Inventors: Youngmin Kim, Yongin-si (KR); Dooseok Choi, Hwaseong-si (KR); Minyoung Yoon, Osan-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 446 days.

(21) Appl. No.: 17/821,523

(22) Filed: Aug. 23, 2022

(65) Prior Publication Data

US 2023/0062464 A1 Mar. 2, 2023

(30) Foreign Application Priority Data

Aug. 26, 2021 (KR) .......................... 10-2021-0113401

(51) Int. Cl.
*H01Q 21/08* (2006.01)
*H04B 1/40* (2015.01)

(52) U.S. Cl.
CPC .............. *H01Q 21/08* (2013.01); *H04B 1/40* (2013.01)

(58) Field of Classification Search
CPC .................................. H01Q 21/08; H04B 1/40
See application file for complete search history.

(56) References Cited

U.S. PATENT DOCUMENTS

| | | | |
|---|---|---|---|
| 10,566,695 B2* | 2/2020 | Wu | H01Q 9/285 |
| 10,741,933 B2 | 8/2020 | Yong et al. | |
| 10,892,561 B2 | 1/2021 | Lin et al. | |
| 11,005,167 B2 | 5/2021 | Apostolos et al. | |
| 11,418,230 B2 | 8/2022 | Noh et al. | |
| 2011/0156986 A1* | 6/2011 | Baliarda | H04W 16/24 |
| | | | 343/893 |
| 2012/0280881 A1* | 11/2012 | Beausang | H01Q 15/14 |
| | | | 343/837 |
| 2018/0145424 A1 | 5/2018 | Puente Baliarda et al. | |
| 2019/0268052 A1* | 8/2019 | Ho | H04B 7/0617 |

(Continued)

FOREIGN PATENT DOCUMENTS

| | | |
|---|---|---|
| JP | 2013-219533 | 10/2013 |
| KR | 10-2021-0034994 A | 3/2021 |

OTHER PUBLICATIONS

Extended European Search Report dated Jan. 20, 2023 in corresponding European Patent Application No. 22191410.4 (9 pages).

(Continued)

*Primary Examiner* — Junpeng Chen
(74) *Attorney, Agent, or Firm* — Morgan, Lewis & Bockius LLP

(57) ABSTRACT

Provided is an antenna array structure including a plurality of first antenna elements for transmitting and receiving a signal at a first frequency and a plurality of second antenna elements for transmitting and receiving a signal at a second frequency, wherein the plurality of first antenna elements are disposed in a first layer and aligned to a line extending in a first direction and the plurality of second antenna elements are disposed in a second layer and aligned to the line.

19 Claims, 16 Drawing Sheets

(56) References Cited

U.S. PATENT DOCUMENTS

| | | |
|---|---|---|
| 2019/0319364 A1 | 10/2019 | Yang et al. |
| 2020/0403322 A1 | 12/2020 | Ryu et al. |
| 2021/0066814 A1 | 3/2021 | Kim et al. |
| 2021/0066817 A1* | 3/2021 | Tehran ................. H01Q 21/065 |
| 2021/0135378 A1 | 5/2021 | Cho et al. |
| 2021/0249751 A1* | 8/2021 | Lee .......................... H01Q 1/02 |

OTHER PUBLICATIONS

Office Action dated Sep. 15, 2025 issued in corresponding Korean Patent Application No. 10-2021-0113401. (Note: U.S. 2021-0066817 A1, and U.S. 2018-0145424 A1 already submitted.).

* cited by examiner

ANTENNA ARRAY STRUCTURE INCLUDING STACKED AND INTERLEAVED ANTENNA ELEMENTS AND METHOD OF ARRANGING THE SAME

CROSS-REFERENCE TO RELATED APPLICATION

This application is based on and claims priority under 35 U.S.C. § 119 to Korean Patent Application No. 10-2021-0113401, filed on Aug. 26, 2021, in the Korean Intellectual Property Office, the disclosure of which is incorporated by reference herein in its entirety.

Technical Field

This disclosure relates to generally to antenna arrays, e.g., phased arrays, and more particularly, to an antenna array structure operational over multiple frequency bands and having a small form factor.

Discussion of the Related Art

A communication device may transmit/receive a signal using an antenna array structure to overcome signal to noise ratio (SNR) loss caused by high transmission loss at mmWave frequencies e.g., a cellular Frequency Range 2 (FR2) band. Effective Isotopic Radiated Power (EIRP) is based on the maximum gain of the antenna array structure of the communication device. Currently, the FR2 band has been broadly expanded to "Low Bandwidth (LB)" (e.g., 24.25 GHz to 29.5 GHz) and "High Bandwidth (HB)" (e.g., 37 GHz to 43.5 GHz), such as n257 (26.5 GHz to 29.5 GHz)/n258 (24.25 GHz to 27.5 GHz)/n259 (39.5 GHz to 43.5 GHz)/n260 (37 GHz to 40 GHz), and the like.

SUMMARY

Embodiments of the inventive concept provide an antenna array structure capable of efficiently transmitting and receiving communication signals over a plurality of frequency bands and a method of arranging the antenna array structure.

According to an aspect of the inventive concept, there is provided an antenna array structure including: a plurality of first antenna elements for transmitting and/or receiving a signal at a first frequency and a plurality of second antennas for transmitting and/or receiving a signal at a second frequency, wherein the plurality of first antenna elements are disposed in a first layer and aligned, as viewed from a point above the antenna array structure, to a first line extending in a first direction and the plurality of second antennas are disposed in a second layer and aligned, as viewed from the point above the antenna array structure, to a second line parallel to the first line, and wherein a first distance between two adjacent first antennas is different from a second distance between two adjacent second antennas.

According to another aspect of the inventive concept, there is provided an antenna module including: an antenna array structure including a plurality of first antenna elements for transmitting and receiving signals within a first frequency band and a plurality of second antenna elements for transmitting and receiving signals within a second frequency band; and a transceiver configured to provide and receive the signals to and from the plurality of first and second antenna elements, wherein the antenna array structure includes: at least one stacked antenna group each including one first antenna element overlapping one second antenna element in a first direction orthogonal to a major surface of the second antenna element; and at least one interleaved antenna group each including at least one first antenna element adjacent to the one first antenna in a second direction orthogonal to the first direction and at least second antenna element adjacent to the one second antenna element in the second direction, wherein the at least one first antenna element does not overlap the at least one second antenna in the first direction.

According to another aspect of the inventive concept, there is provided a method of arranging an antenna array structure including a plurality of first antenna elements and a plurality of second antenna elements, the method including: arranging one first antenna element for transmitting and receiving a signal at a first frequency at a reference point as a reference antenna; arranging another first antenna element apart from the reference antenna by a distance proportional to a first wavelength at the first frequency; and arranging the plurality of second antenna elements for transmitting and receiving a signal at a second frequency by separating the plurality of second antenna elements from each other by a distance proportional to a second wavelength at the second frequency.

According to another aspect of the inventive concept, there is provided a method of arranging an antenna array structure including a plurality of first antenna elements and a plurality of second antenna elements, the method including: arranging a stacked antenna group including at least one first antenna element and at least one second antenna element that overlap each other; and arranging an interleaved antenna group adjacent to the stacked antenna group, the interleaved antenna group including at least one first antenna element and at least one second antenna element that do not overlap each other, wherein the plurality of first antenna elements is for transmitting and receiving a signal within a first frequency band, and wherein the plurality of second antenna elements is for transmitting and receiving a signal within a second frequency band different from the first frequency band.

According to another aspect, an antenna system includes an antenna array structure with first and second antenna arrays; and a transmitter and/or a receiver. The first antenna array includes first antenna elements arranged along a line as viewed from a point above the antenna array structure, where each of the first antenna elements is spaced from one another by a first distance and allocated for transmitting and/or receiving first signals within a first frequency band. The second antenna array includes second antenna elements that alternate with the first antenna elements along the line as viewed from the point above the antenna array structure, each of the second antenna elements having an aperture size larger than at least one aperture size of the first antenna elements. The second antenna elements are each spaced from one another by the first distance, and are allocated for transmitting and/or receiving second signals within a second frequency band. The transmitter/receiver is configured to output the first signals and/or receive the first signals to/from the first antenna elements, and to output the second signals and/or receive the second signals to/from the second antenna elements.

BRIEF DESCRIPTION OF THE DRAWINGS

Embodiments of the inventive concept will be more clearly understood from the following detailed description taken in conjunction with the accompanying drawings in which like reference labels indicate like elements or features. Various elements of the same or similar type may be distinguished by annexing the reference label with an underscore and second label that distinguishes among the same/similar elements (e.g., _1, _2). However, if a given description uses only the first reference label, it is applicable to any one of the same/similar elements having the same first reference label irrespective of the second label.

DETAILED DESCRIPTION OF EMBODIMENTS

Hereinafter, embodiments of the present disclosure will be described in detail with reference to the accompanying drawings.

Figure 1:
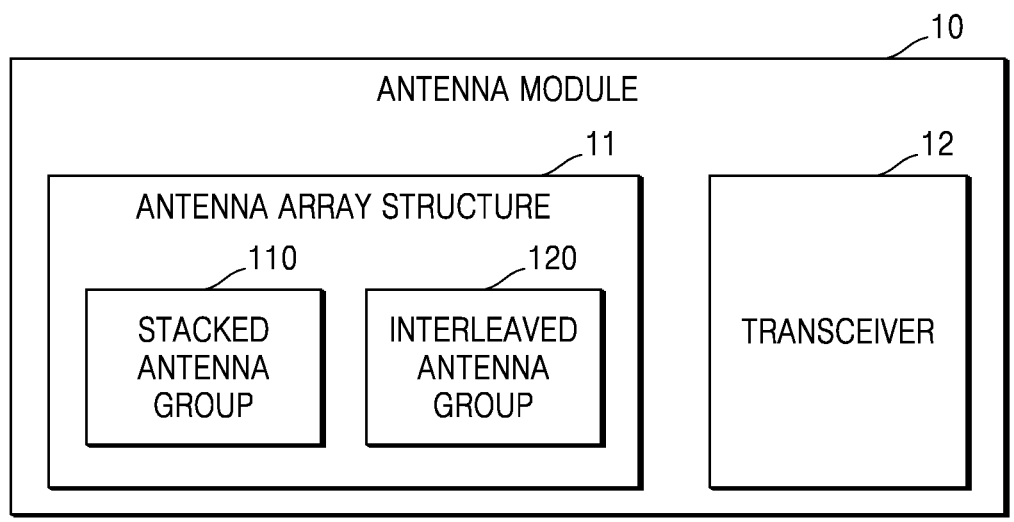
FIG. 1 is a block diagram illustrating configurations of an antenna module according to an embodiment of the present disclosure.

FIG. 1 is a block diagram illustrating configurations of an antenna module 10 according to an embodiment of the present disclosure.

A user equipment (UE) including the antenna module 10 may perform wireless communication with a base station in a wireless communication system. The wireless communication system, as a non-limiting example, may be a wireless communication system using a cellular network, such as a 5th generation wireless (5G) system, a Long Term Evolution (LTE) system, an LTE-Advanced system, a Code Division Multiple Access (CDMA) system, a Global System for Mobile Communications (GSM) system, and the like, and may be a Wireless Personal Area Network (WPAN) system, or any other wireless communication system. Hereinafter, a wireless communication system will be mainly described with reference to a wireless communication system using a cellular network, but it will be understood that example embodiments of the present disclosure are not limited thereto.

A base station (BS) may generally refer to a fixed station that communicates with a UE and/or other BSs, and may exchange data and control information by communicating with the UE and/or other BSs. For example, the BS may be referred to as a Node B, an evolved-Node B (eNB), a next generation Node B (gNB), a sector, a site, a base transceiver system (BTS), an Access Point (AP), a relay node, a remote radio head (RRH), a radio unit (RU), a small cell, and the like. Herein, the BS or the cell may be interpreted in a comprehensive meaning indicating some areas or functions covered by a Base Station Controller (BSC) in CDMA, a Node-B in WCDMA (Wideband CDMA), an eNB in LTE, a gNB or sector (site) in 5G, and the like, and may cover all of various coverage areas such as a megacell, a macrocell, a microcell, a picocell, a femtocell and relay node, an RRH, an RU, and a small cell communication range.

A UE may be fixed or mobile, and may refer to a BS, e.g., any device capable of communicating with a BS to transmit and receive data and/or control information. For example, the UE may be referred to as a terminal, a terminal equipment, a mobile station (MS), a mobile terminal (MT), a user terminal (UT), a subscriber station (SS), a wireless device, and a handheld device. Hereinafter, example embodiments of the present disclosure will be mainly described with reference to a UE as a wireless communication device, but it will be understood that example embodiments of the present disclosure are not limited thereto.

The wireless communication network between the UE and the BS may support a plurality of users to communicate by sharing the available network resources. For example, in a wireless communication network, information may be delivered with various multiple access methods such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), OFDM-FDMA, OFDM-TDMA, OFDM-CDMA, and the like. The UE may communicate with the BS through an uplink (UL) and a downlink (DL). In some embodiments, UEs may communicate with each other via a sidelink, such as Device-to-Device (D2D). The UE may transmit and receive communication signals to and from the BS through the antenna module 10.

Referring to FIG. 1, the antenna module 10 may include an antenna array structure 11 and a transceiver 12. The antenna module 10 may be implemented as an Antenna-in-Package (AiP), but is not limited thereto, and may also be implemented as an Antenna-on-Chip (AoC) and an Antenna-in-Board (AiB). The antenna module 10 may output a transmission signal through a plurality of antennas and/or may receive a reception signal through the plurality of antennas.

The antenna array structure 11 may include at least one stacked antenna group 110 and at least one interleaved antenna group 120, and the stacked antenna group 110 and the interleaved antenna group 120 may be alternately disposed. The stacked antenna group 110 may be an antenna group in which a plurality of antennas are overlapped at one point, and the interleaved antenna group 120 may be an antenna group in which a plurality of antennas are interleaved at a plurality of points.

The transceiver 12 may include a circuit for generating a transmission signal based on data generated from a communication processor or an application processor, and may include a circuit for converting a reception signal received from the BS or other UE into data. Hereinafter, an embodiment in which a signal is transmitted/received through a plurality of transmission paths and a plurality of reception paths by the transceiver 12 will be described with reference to FIG. 2. Example embodiments may be described with reference to reference numerals of the components shown in FIG. 1.

Figure 2:
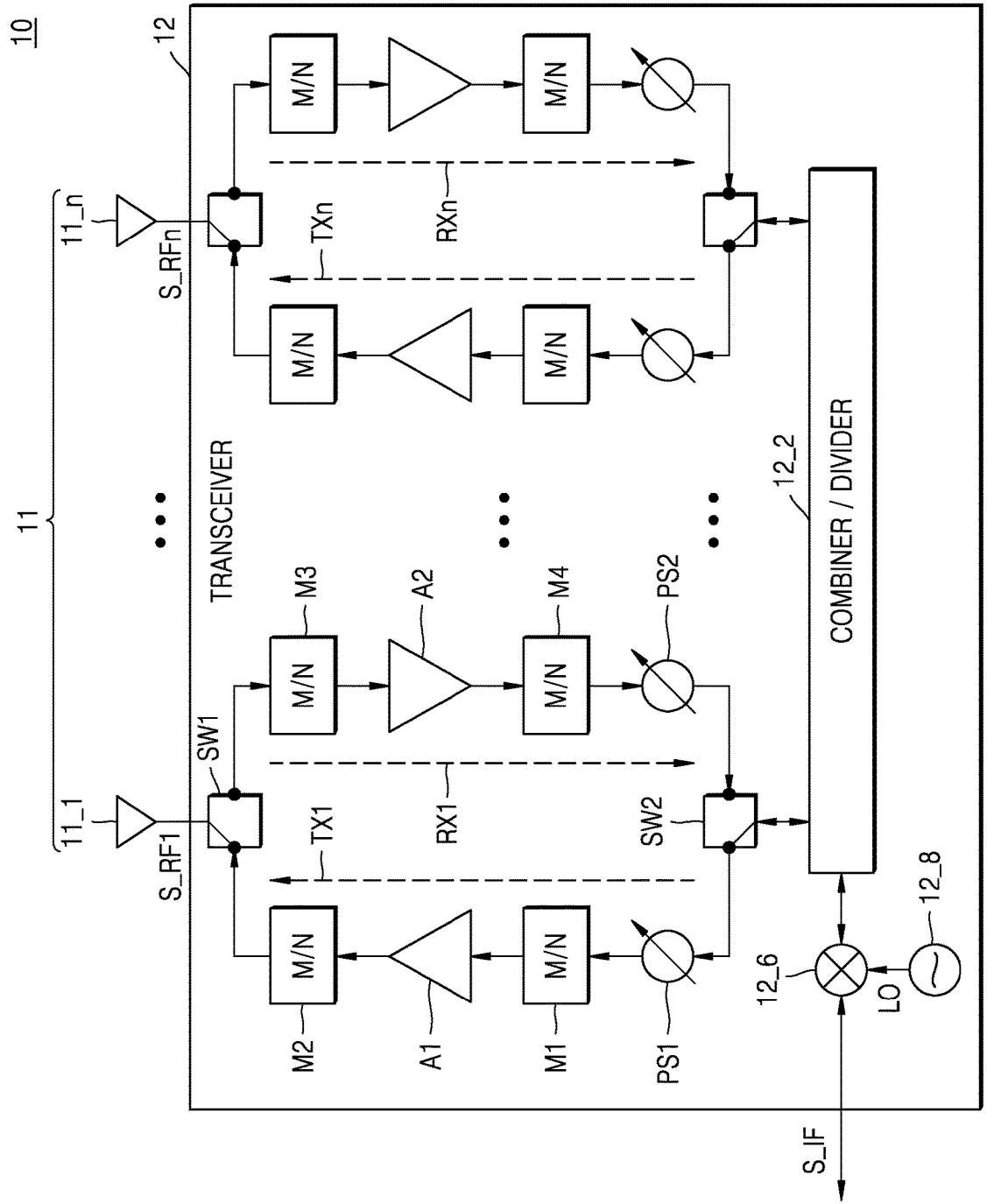
FIG. 2 shows an antenna module according to an example embodiment of the present disclosure.

FIG. 2 shows an antenna module 10 according to an example embodiment of the present disclosure.

As shown in FIG. 2, the antenna module 10 may include a transceiver 12 and an antenna array structure 11 including first to n-th antennas 11_1 to 11_n (n is an integer greater than 1). As described above with reference to FIG. 1, the antenna module 10 may output the first to n-th RF (Radio Frequency) signals S_RF1 to S_RFn to the first to n-th antennas 11_1 to 11_n, or may receive the first to n-th RF signals S_RF1 to S_RFn from the first to n-th antennas 11_1 to 11_n, and may generate or receive the IF (Intermediate Frequency) signal S_IF.

The first to n-th antennas 11_1 to 11_n may be used, as non-limiting examples, for spatial diversity, polarization diversity, spatial multiplexer, beamforming, and the like. Each of the first to n-th antennas 11_1 to 11_n may be any type of antenna, for example, a patch antenna, a dipole antenna, or the like. As shown in FIG. 2, the transceiver 12 may include circuits corresponding to the first to n-th antennas 11_1 to 11_n, respectively, and may include a combiner/divider 12_2 (equivalently, "combiner/divider network 12_2"), a mixer 12_6, and an LO (local oscillating signal) generator 12_8.

In the transceiver 12, n transmission paths TX1 to TXn and n reception paths RX1 to RXn corresponding to the first to n-th antennas 11_1 to 11_n may be formed. For example, as shown in FIG. 2, a first transmission path TX1 and a first reception path RX1 corresponding to the first antenna 11_1 may be formed, and an n-th transmission path TXn and an n-th reception path RXn corresponding to the n-th antenna 11_n may be formed. In addition, in order that the first transmission path TX1 is selected in the transmission mode, and the first reception path RX1 is selected in the reception mode, the transceiver 12 may include first and second switches SW1 and SW2, and the first and second switches SW1 and SW2 of FIG. 2 indicate a state in which the first transmission path TX1 is selected in the transmission mode.

The combiner/divider 12_2 may provide signals up-converted from the IF signal S_IF by the local oscillating signal LO in the transmission mode to the first to n-th transmission paths TX1 to TXn, and may provide at least some of the signals received from the first to n-th reception paths RX1 to RXn or a combined signal thereof to the mixer 12_6 in the reception mode. The mixer 12_6 may perform up-conversion or down-conversion according to the local oscillating signal LO. The LO generator 12_8 may generate a local oscillating signal LO based on a carrier frequency or the like, and in some embodiments, may include a phased locked loop (PLL).

The transmission path may include a transmission circuit, and for example, as shown in FIG. 2, the transmission circuit constituting the first transmission path TX1 may include a first phase shifter PS1, a first matching network M1, a first amplification circuit A1, and a second matching network M2. In addition, the transmission circuit may include a power amplifier, and for example, a first matching network M1, a first amplification circuit A1, and a second matching network M2 may constitute a power amplifier. Similarly, the reception path may include a reception circuit, and for example, as shown in FIG. 2, the reception circuit constituting the first reception path RX1 may include a third matching network M3, a second amplification circuit A2, a fourth matching network M4, and a second phase shifter PS2. In addition, the reception circuit may include a low noise amplifier, and for example, the third matching network M3, the second amplification circuit A2, and the fourth matching network M4 may constitute a low noise amplifier. Herein, the first matching network M1, the second matching network M2, third matching network M3, the fourth matching network M4 and the like may be collectively referred to as matching networks (M/N). In some embodiments, some of the components shown in FIG. 2 constituting the transmission path and/or the reception path may be omitted, and components may be arranged differently from that shown in FIG. 2. For instance, some embodiments of an antenna system including the antenna array structures herein may be designed to operate only as a transmitting antenna system without reception capability, and other embodiments may be designed to operate only as a receiving antenna system without transmission capability. Hereinafter, example embodiments of the present disclosure will be described with reference mainly to a first transmission path TX1 and a first reception path RX1 corresponding to the first antenna 11_1.

The transmission circuit and reception circuit may include, for example, an active device such as a transistor or a phase shifter, and may include a passive device such as a capacitor, an inductor, or the like. For example, in the transmission circuit constituting the first transmission path TX1, the first amplification circuit A1 may include at least one transistor as an active element, and the first and second matching networks M1 and M2 may include at least one capacitor and/or at least one inductor.

Components included in the transceiver 12 may be manufactured by a semiconductor process. In one example, when the transceiver 12 is manufactured in a Complementary Metal Oxide Semiconductor (CMOS) process as a single chip, the transceiver 12 may provide low cost and high integration, while providing relatively low output power capability, low linearity, and weak breakdown characteristics. In another example, when the transceiver 12 is fabricated as a single chip, for example, in a Bipolar-CMOS (BiCMOS) process such as a SiGe BiCMOS process, the transceiver 12 may provide high output power capability compared to CMOS process, while also incurring high cost. In another example, when the transceiver 12 is manufactured as a single chip, for example, in a III-V compound semiconductor process such as a GaAs compound semiconductor process, the transceiver 12 may provide higher output power capability and linearity than the processes described above, while resulting in a large area due to low integration as well as high cost.

The transceiver 12 may include two or more chips manufactured by different semiconductor processes. For example, the combiner/divider 12_2, the mixer 12_6, and the LO generator 12_8 may be included in a chip manufactured by a CMOS process that increases the degree of integration, and the remaining components of the transceiver 12, including the transmission circuits and reception circuits, may be included into a chip made with a semiconductor process that may provide higher performance. In addition, when only the transmission circuit, which requires higher performance than the reception circuit, is included in a chip manufactured by a semiconductor process different from the CMOS process, such as a III-V compound semiconductor process, due to the limited number of layers and dielectric materials, it may be difficult to integrate passive components, and as a result, a chip including a transmission circuit may become overly complex.

Figure 3A:
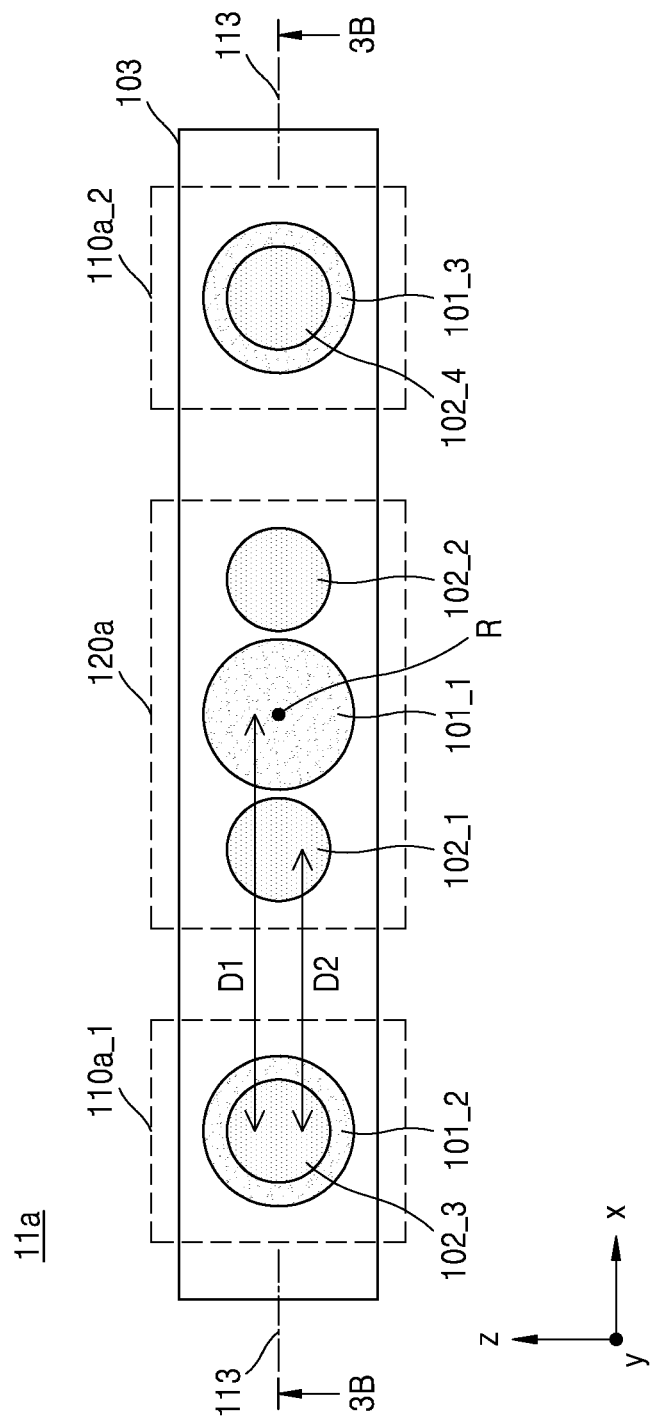
FIG. 3A is a plan view of an antenna array structure including a stacked antenna group and an interleaved antenna group that are alternately disposed according to an embodiment.
Figure 3B:
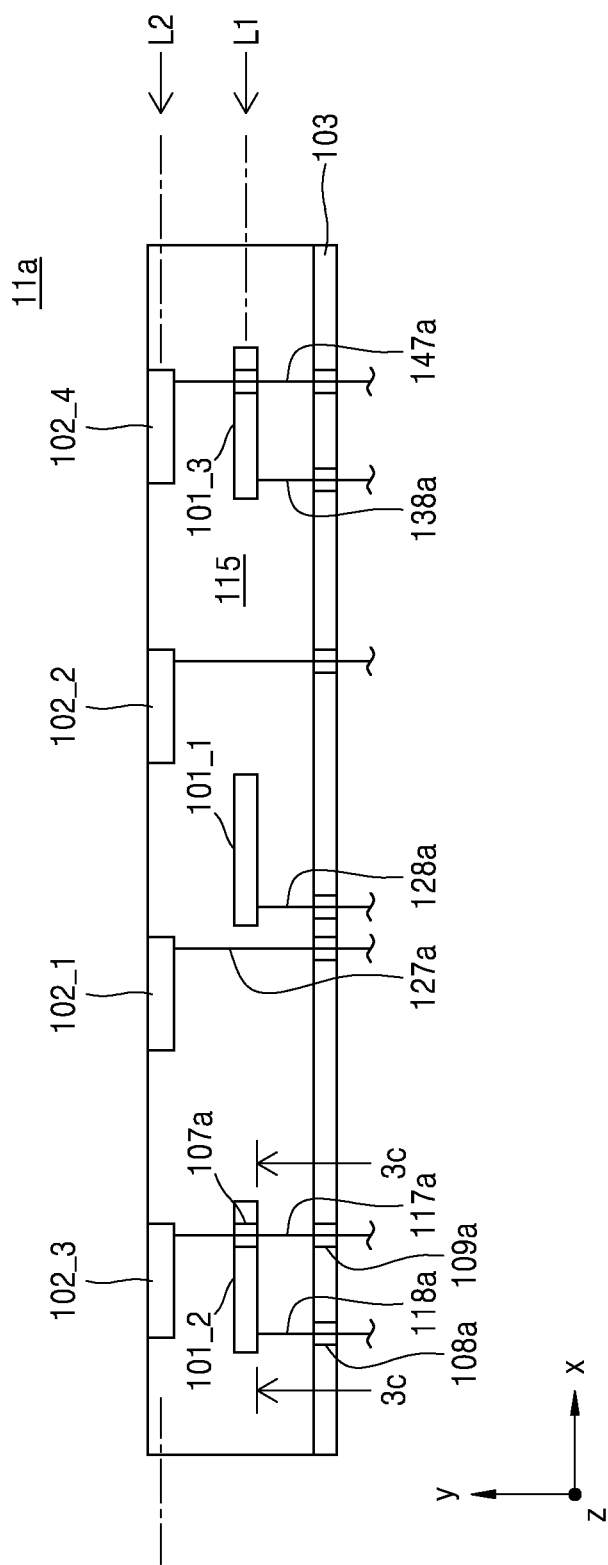
FIG. 3B is an example cross-sectional view of FIG. 3A as viewed from a central, longitudinal axis of the antenna array structure.
Figure 3C:
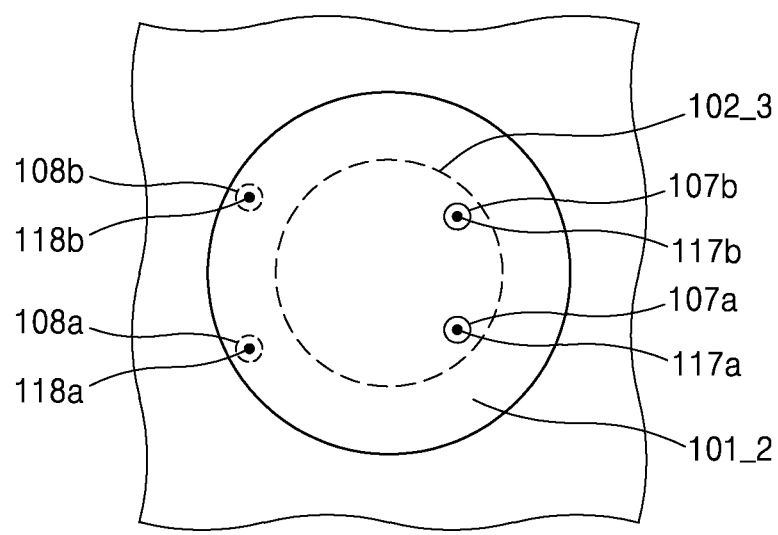
FIG. 3C is an example partial cross-sectional view of FIG. 3B taken along the lines 3C-3C.

FIG. 3A is a plan view of an example antenna array structure, 11a, in which stacked antenna groups 110a_1 and 110a_2 and an interleaved antenna group 120a are alternately arranged according to an embodiment. FIG. 3B is an example cross-sectional view taken along a central longitudinal line 3B-3B through the antenna array structure of FIG. 3A, depicting an example layered arrangement and feed structure. FIG. 3C is a partial cross-sectional view taken along the line 3C-3C of FIG. 3B, for illustrating an example stacked antenna element feed configuration.

Referring collectively to FIGS. 3A-3C, each antenna group may include a plurality of antenna elements such as microstrip patches, each individually producing a wide antenna pattern, e.g., nearly isotropic. Each antenna group may include at least one first antenna element (or, referred to as an antenna, a first antenna or an antenna element) 101_i (i=any of 1 to 3) (or 101) for transmitting and/or receiving signals at a first frequency and at least one second antenna element (or, referred to as an antenna, a second antenna or an antenna element) 102_j (j=any of 1 to 4) (or 102) for transmitting and/or receiving signals at a second frequency. (Herein, when a signal is said to be transmitted and/or received from/by an antenna element or an antenna array at a "first frequency", the first frequency is a frequency within a first frequency band. If uplink and downlink signals are different, the transmission frequency differs from the reception frequency. Thus, in this case, "first frequency" refers to both a "first transmission frequency" and a "first reception frequency", each of which is in the first frequency band. Likewise, when a signal is said to be transmitted and/or received from/by an antenna element or an antenna array at a "second frequency", the second frequency is a frequency within a second frequency band that differs from the first frequency band. If uplink and downlink signals are different, the transmission frequency differs from the reception frequency in the second frequency band. Hence, in this case, "second frequency" refers to both a "second transmission frequency" and a "second reception frequency", each of which is in the second frequency band.)

The at least one first antenna 101_i may be disposed in a first layer and the at least one second antenna 102_j may be disposed in a second layer. The interleaved antenna group (or an antenna group) 120a may include one first antenna 101_1 and two second antennas 102_1 and 102_2, and each of the stacked antenna groups (or antenna groups) 110a_1 and 110a_2 may include one first antenna 101_2 or 101_3 and one second antenna 102_3 or 102_4. Each of the antennas 101 and 102 may be disposed above a ground plane 103.

The first antenna elements 101_1, 101_2 and 101_3 may have an inter-element spacing D1 and may form a first antenna array that generates a first beam at the first frequency. The second antenna elements 102_1 to 102_4 may have an inter-element spacing D2 shorter than D1 and may form a second antenna array that generates a second beam at the second frequency. Each of the first and second antenna arrays may be a phased array. The first and second antenna arrays may each be a linear array aligned to a common line 113 of the antenna array structure 11a (parallel to the x axis of the 3D coordinate system shown in FIG. 3A). When viewed from the plan view of FIG. 3A, which may be a view from a point above the antenna array structure (from a point external of the antenna array structure 11a, spaced from the major surfaces of the antenna elements 102 along an axis orthogonal to the major surfaces), the first antenna elements 101_1 to 101_3 are aligned to the line 113 and the second antenna elements 102_1 to 101_4 are aligned to the same line 113. Thus, the antenna array structure 11a is composed of a plurality of antenna arrays in a compact configuration, where each antenna array may be optimized for transmitting/receiving signals at a different frequency.

According to an embodiment, the interleaved antenna group 120a may be disposed at a central region of the antenna array structure 11a. A center point of the antenna group 120a may be both a reference point R, and a center point, of the antenna array structure 11a. In particular, a center point of the first antenna 101_1 may be disposed at the reference point R. (Thus, the location of the first antenna 101_1 may be defined herein to be at the reference point R.) The interleaved antenna group 120a may be an antenna group in which antennas for transmitting and receiving signals of different respective frequencies are alternately disposed. For example, when the interleaved antenna group 120a consists of a first antenna 101_1 and two second antennas 102_1 and 102_2, the first antenna 101_1 and the second antennas 102_1 and 102_2 may be alternately disposed. The plurality of antennas of the antenna array structure 11a may be symmetrically disposed with respect to the reference point R.

The antenna array structure 11a may include a plurality of stacked antenna groups 110a_1 and 110a_2, where the stacked antenna groups 110a_1 and 110a_2 may be disposed on opposite sides of the interleaved antenna group 120a. In the orientation of FIG. 3A, the first and second stacked antenna groups 110a_1 and 110a_2 may be disposed on the left side, and the right side, respectively, of the interleaved antenna group 120a. Each of the stacked antenna groups 110a_1 and 110a_2 may be spaced from the interleaved antenna group 120a along the line 113 by the same distance.

The first antenna 101_2 or 101_3 included in the stacked antenna group 110a_1 or 110a_2 may be spaced from the first antenna 101_1 included in the interleaved antenna group 120a by a first distance D1, such that the first antenna array has a uniform inter-element spacing of D1. Adjacent two of the second antenna 102_3 included in the stacked antenna group 110a_1, second antenna 102_4 included in the stacked antenna group 110a_2, the second antenna 102_1 included in the interleaved antenna group 120a, and the second antenna 102_2 included in the interleaved antenna group 120a may be spaced from each other by a second distance D2, such that the second antenna array has a uniform inter-element spacing of D2. The first distance D1 and the second distance D2 may be proportional to the wavelength at the first frequency and the wavelength at the second frequency, respectively. In this case, the first distance D1 may be a distance obtained by multiplying the wavelength at the first frequency by a predefined weight, and the second distance D2 may be a distance obtained by multiplying the wavelength at the second frequency by a predefined weight. A weight for determining each distance will be described later in detail with reference to FIG. 5. In an example, the first distance D1 and the second distance D2 may be determined based on a ratio of the wavelength at the first frequency to the wavelength at the second frequency.

When the first frequency is lower than the second frequency, because the first wavelength is proportional to the reciprocal of the first frequency, and the second wavelength is proportional to the reciprocal of the second frequency, the first wavelength may be longer than the second wavelength. For example, the first frequency may be 28 GHz as the center frequency of a low frequency band, and the second frequency may be 39 GHz as the center frequency of a high frequency band.

As shown in FIG. 3A, one first antenna 101_1 may be disposed at the reference point R, and the two first antennas 101_2 and 101_3 each spaced from antenna 101_1 by the first distance D1 may be disposed at opposite end points of the antenna array structure 11a. The two second antennas 102_3 and 102_4 may overlap the first antennas 101_2 and 101_3 disposed at both end points, respectively, and the overlapping first antenna 101_2 or 101_3 and the second antenna 102_3 or 102_4 may be referred to as stacked antenna group 110a_1 or 110a_2. Each of the two second antennas 102_1 and 102_2 may be spaced from each other along the line 113 by a second distance D2 toward the reference point R from each of the second antennas 102_3 and 102_4 disposed at both end points. The two second antennas 102_1 and 102_2 and the first antenna 101_1 disposed at the reference point R may be referred to as an interleaved antenna group 120a.

As shown in the example of FIGS. 3B and 3C, one example of a layered arrangement and an antenna feed structure for the antenna array structure 11a is illustrated. The first antenna elements 101 may be disposed at a first level L1 above the ground plane 103. The second antenna elements 102 may be disposed at a higher second level L2 above the ground plane 103. Each of the antenna elements 101 and 102 may be microstrip patch elements separated from the ground plane 103 by a dielectric material 115. In this example, each of the first and second antenna elements 101 and 102 is fed in a dual probe feed arrangement to provide dual polarization. For the stacked antenna groups, the probe feed to the upper (second) antenna element 102 may pass through an opening within the lower (first) antenna element directly below it. For instance, probe feeds 117a and 117b may pass through openings 107a and 107b, respectively, within first antenna element 101_2, and connect on upper ends thereof to separated peripheral regions on second antenna element 102_3. A lower end of probe feed 117a may pass through an opening 109a within ground plane 103, and a lower end of probe feed 117b may pass through a similar opening (not shown, but aligned with opening 107b) in ground plane 103. Probe feed 147a connected to second antenna element 102_4 may be similarly structured. In the interleaved antenna group, probe feeds such as 127a traverse the dielectric material 115 directly to the second antenna elements such as 102_1 without passing through any first antenna element 101. Probe feeds such as 118a and 118b connected to separated peripheral region points on first antenna element 101_2 may similarly pass through openings 108a and 108b, respectively, in ground plane 103. Probe feeds 128a and 138a shown in FIG. 3B may similarly connect to first antenna elements 101_1 and 101_3, respectively, each as part of a probe feed pair to provide dual polarization. The lower ends of each of the probe feeds may connect to the transceiver 12 (see FIG. 2).

In other embodiments, instead of probe feeds, the antenna elements 101 and 102 are side-fed and/or parasitically driven. Whatever feeds are employed, in other embodiments, only a single polarization is provided, whereby a single probe feed or a single side-fed feed is provided to each directly fed antenna element 101 or 102.

Figure 4:
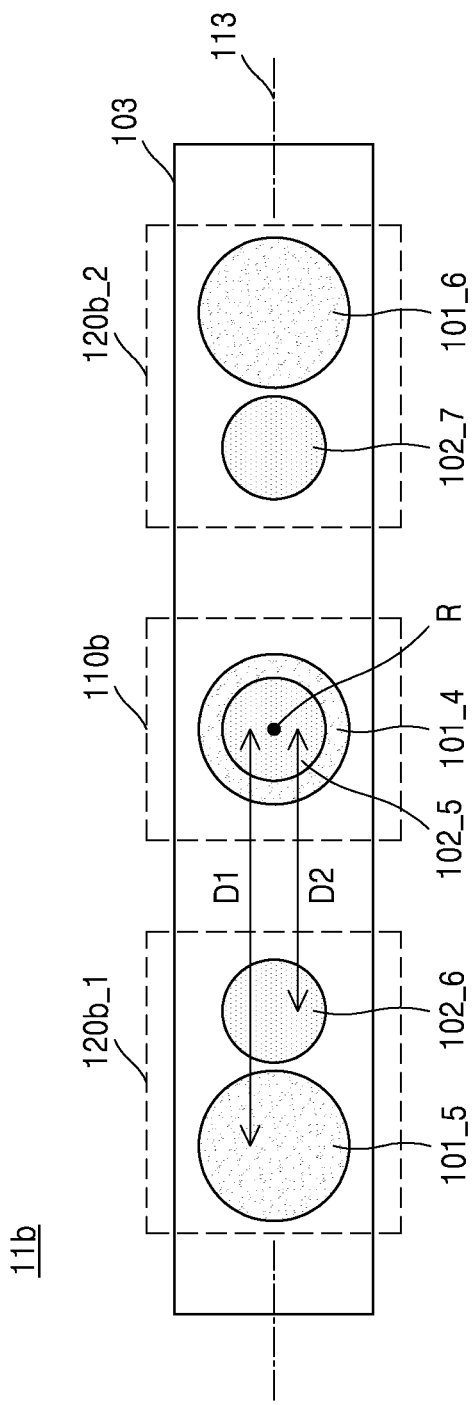
FIG. 4 is a diagram illustrating an antenna array structure including a stacked antenna group and an interleaved antenna group that are alternately disposed according to another embodiment.

FIG. 4 is a plan view of an antenna array structure, 11b, illustrating an embodiment in which a stacked antenna group 110b and an interleaved antenna groups 120b_1 and 120b_2 are alternately arranged according to another embodiment.

Referring to FIG. 4, the interleaved antenna groups 120b_1 or 120b_2 may include one first antenna 101_5 or 101_6 and the second antenna 102_6 or 102_7 disposed spaced apart from each other, and the stacked antenna group 110b may include one first antenna 101_4 and one second antenna 102_5 disposed to overlap each other. The stacked antenna group 110b may be disposed at the reference point of the antenna array 11b, and in particular, the first antenna 101_4 and the second antenna 102_5 of the stacked antenna group 110b may be disposed at a reference point of the antenna array 11b.

The antenna array 11b may include the interleaved antenna groups 120b_1 and 120b_2, and the interleaved antenna groups 120b_1 and 120b_2 may be disposed on both sides of the stacked antenna group 110b. For example, the first interleaved antenna group 120b_1 may be disposed on the left side of the stacked antenna group 110b, and the second interleaved antenna group 120b_2 may be disposed on the right side of the stacked antenna group 110b, and each of the interleaved antenna groups 120b_1 and 120b_2 may be spaced from the stacked antenna group 110b by the same distance along the line 113.

According to one embodiment, the first antenna 101_4 included in the stacked antenna group 110b and the first antenna 101_5 or 101_6 included in the interleaved antenna group 120b_1 or 120b_2 may be spaced apart from each other by a first distance D1, and each of the second antennas 102_5 included in the stacked antenna group 110b and the second antenna 102_6 or 102_7 included in the interleaved antenna group 120b_1 or 120b_2 may be spaced apart from each other by a second distance D2. Because the first distance D1 and the second distance D2 have been described above with reference to FIG. 3A, a detailed description thereof will be omitted.

In the example of FIG. 4, one first antenna 101_4 and one second antenna 102_5 may be disposed at a reference point R of the antenna array 11b, and the two first antennas 101_5 and 101_6 spaced apart by the first distance D1 from the reference point may be disposed at both end points of the antenna array 11b. The two second antennas 102_6 and 102_7 may be spaced apart from the second antenna 102_5 disposed at the reference point R by a second distance D2, respectively.

Figure 5:
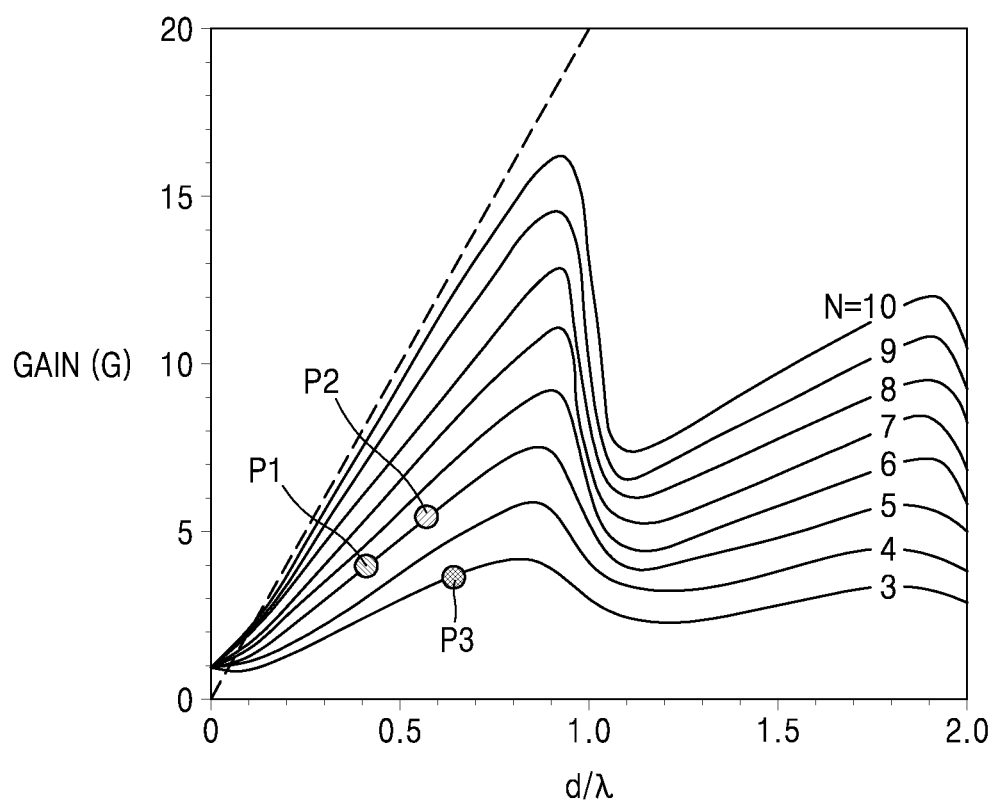
FIG. 5 is a graph illustrating a signal gain with respect to a distance between a plurality of antennas according to an example embodiment.

FIG. 5 is a graph illustrating a signal gain with respect to a distance between a plurality of antennas according to an example embodiment.

A signal gain of each antenna array within the antenna array structure 11 composed of a plurality of antenna arrays (e.g., two antenna arrays, one formed by first antenna elements 101 and another formed by antenna elements 102) and a distance between the antennas may have a relationship as shown in Equation 1 below.

$$D = \frac{\left|\frac{\sin(N\delta/2)}{N\sin(\delta/2)}\right|^2}{\frac{1}{N} + \frac{2}{N^2}\sum_{m=1}^{N-1}\frac{N-m}{m\beta d}\sin m\beta d \cos m\alpha} \quad \text{[Equation 1]}$$

Here, D is a signal gain, N is the number of antennas, and d is a distance between antennas within each antenna array. FIG. 5 is a graph illustrating a relationship of a signal gain and a distance between antennas of Equation 1 above. The x-axis of FIG. 5 is a ratio (d/k) of a distance between antennas to wavelength, and the y-axis is signal gain D. In an embodiment, α, β and δ may be related parameters of the ratio (d/k) of the distance between antennas to wavelength.

As comparing the first point P1 and the second point P2 of FIG. 5, when the number of antennas disposed in the antenna array 11 is five, until the distance-to-wavelength ratio becomes 1, as the distance-to-wavelength ratio increases, the signal gain may increase. As comparing the second point P2 and the third point P3 of FIG. 5, even if the ratio of distance to wavelength is similar, as the number of antennas disposed in the antenna array increases, the signal gain may increase. Thus, the signal gain of the antenna module 10 may increase as the number of antennas increases when the ratio of distance to wavelength is about 0.7 to about 0.8. However, as the number of antennas increases, because the size of the antenna module 10 increases and power consumption increases, three first antennas (forming a first antenna array) and four second antennas (forming a second antenna array) are disposed in the antenna array structure 11 of FIG. 3A, and three first antennas and three second antennas are disposed in the antenna array structure 11 of FIG. 4, so that the antennas may be efficiently arranged in consideration of power consumption and the size of the antenna module 10.

In this case, the weight for determining the distance between the antennas may be a ratio of distance to wavelength of FIG. 5. For example, the weight may be about 0.7 to about 0.8 where the signal gain is greatest, and to reduce a side-lobe formed by beamforming, the weight may be determined to be about 0.65.

Thus, the distance between the antennas may be determined according to the ratio of distance to wavelength at which the signal gain is greatest. When the distance between each antenna is determined by the distance ratio for the same wavelength, a distance between antennas performing communication at the first frequency and a distance between antennas performing communication at the second frequency may be different. Thus, when the first antenna and the second antenna overlap at any one point in the antenna array structure, the first antenna and the second antenna disposed spaced apart from the overlapping first and second antennas do not overlap, and as in the embodiment of FIGS. 3A and 4, the stacked antenna group 110 and the interleaved antenna group 120 may be alternately arranged.

Accordingly, the antenna module 10 may provide optimal performance due to a signal gain obtained by implementing optimal antenna spacing in the same form factor without increasing the number of antennas of the antenna array structure 11. In addition, referring to FIG. 2, when the number of antennas increases, the path through which signals are transmitted and received between the transceiver 12 and the antenna also increases, but when the signal gain is provided by optimizing the antenna spacing without increasing the number of antennas, because it is unnecessary to increase the signal transmission and reception path between the transceiver 12 and the antenna, improved performance may be provided even when a small Integrated Circuit (IC) is used. In addition, the antenna module 10 may provide higher performance without an increase in power consumption.

Figure 6:
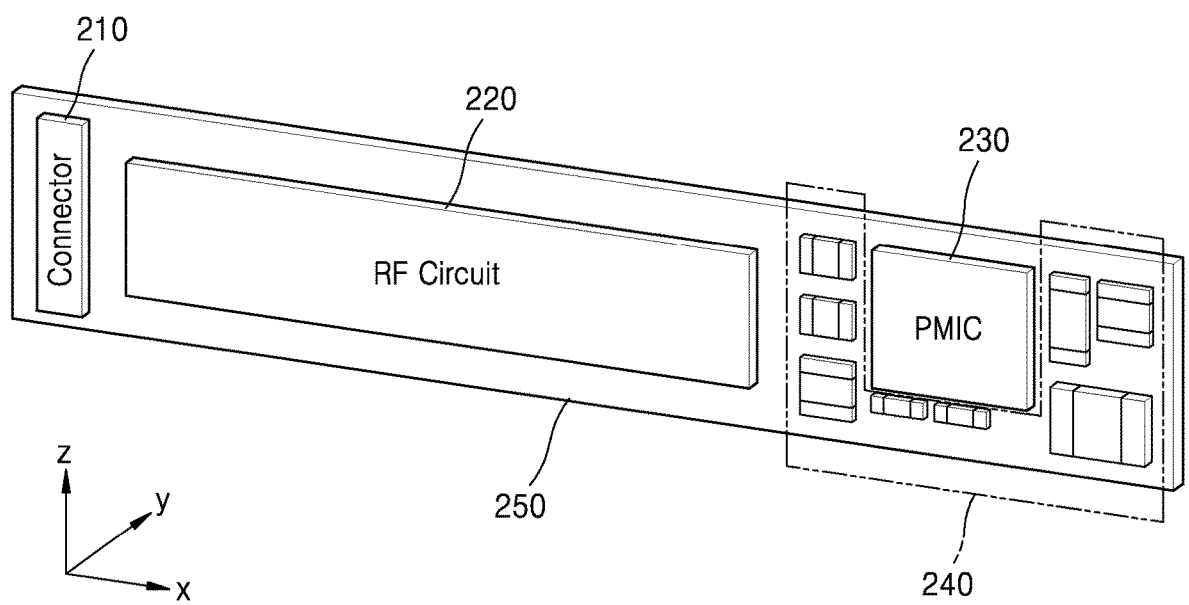
FIG. 6 is a diagram illustrating an antenna module on which a plurality of elements are mounted according to an embodiment of the present disclosure.

FIG. 6 is a diagram illustrating the antenna module 10 on which a plurality of elements are mounted according to an embodiment of the present disclosure.

Hereinafter, the y-axis direction may be referred to as a vertical direction, and among the surfaces of the component, the surface exposed in the +y-axis direction may be referred to as the upper surface of the component, and the surface exposed in the −y-axis direction may be referred to as the lower surface of the component, and the surface exposed in a direction perpendicular to the y axis may be referred to as a side surface of the component.

According to one embodiment, an antenna array structure 11 may be mounted on the upper surface of a board 250, and a transceiver 12 (within the RF circuit 220) for generating a communication signal to be provided to the antenna array structure 11 may be mounted on the lower surface of the board 250. Components disposed in the +y-axis direction than other components may be referred to as being above other components, and components disposed in the −y-axis direction than the other components may be referred to as being below the other components. As shown in FIG. 6, the antenna module 10 may include a connector 210, an RF circuit 220, a Power Management Integrated Circuit (PMIC) 230, and discrete elements 240 which are mounted on a lower surface of the board 250. The antenna array structure 11 of any one of the embodiments of FIGS. 3A-3C, 4, 9, and 10 may be mounted on the upper surface of the board 250.

The antenna array structure 11 may include a plurality of antennas, as described with reference to FIGS. 3A-3C, 4, 9, and 10, and according to the embodiment of FIGS. 2 and 3A-3C, the stacked antenna group 110 and the interleaved antenna group 120 may be alternately disposed, and the antenna may be configured to transmit and receive electromagnetic waves through the upper surface of the antenna module 10, that is, in the y-axis direction. Also, the antenna array structure 11 may be connected to the RF circuit 220 to receive communication signals generated corresponding to each antenna from the RF circuit 220. The RF circuit 220 connected to each antenna of the antenna array structure 11 will be described in detail later with reference to FIGS. 7 and 8.

The connector 210 may couple to a cable and/or other connector and may provide an interface between antenna module 10 and external components. For example, the connector 210 may receive a voltage and/or current for supplying power to the antenna module 10 and transmit the received voltage and/or current to the PMIC 230 of the antenna module 10. In addition, the connector 210 may transmit a signal received from an external component to the RF circuit 220, and may output a signal provided from the RF circuit 220 to an external component.

The PMIC 230 may supply power to a component of the antenna module 10, for example, the RF circuit 220 (e.g., to bias amplifiers and control phase shifters for beam steering), from power provided through the connector 210. For example, the PMIC 230 may generate at least one power supply voltage and provide the at least one power supply voltage to the RF circuit 220 through conductive patterns included in the multilayer substrate.

The discrete elements 240 may include at least one passive element. For example, the discrete elements 240 may include a bypass (or decoupling) capacitor for a stable supply voltage.

Figure 7:
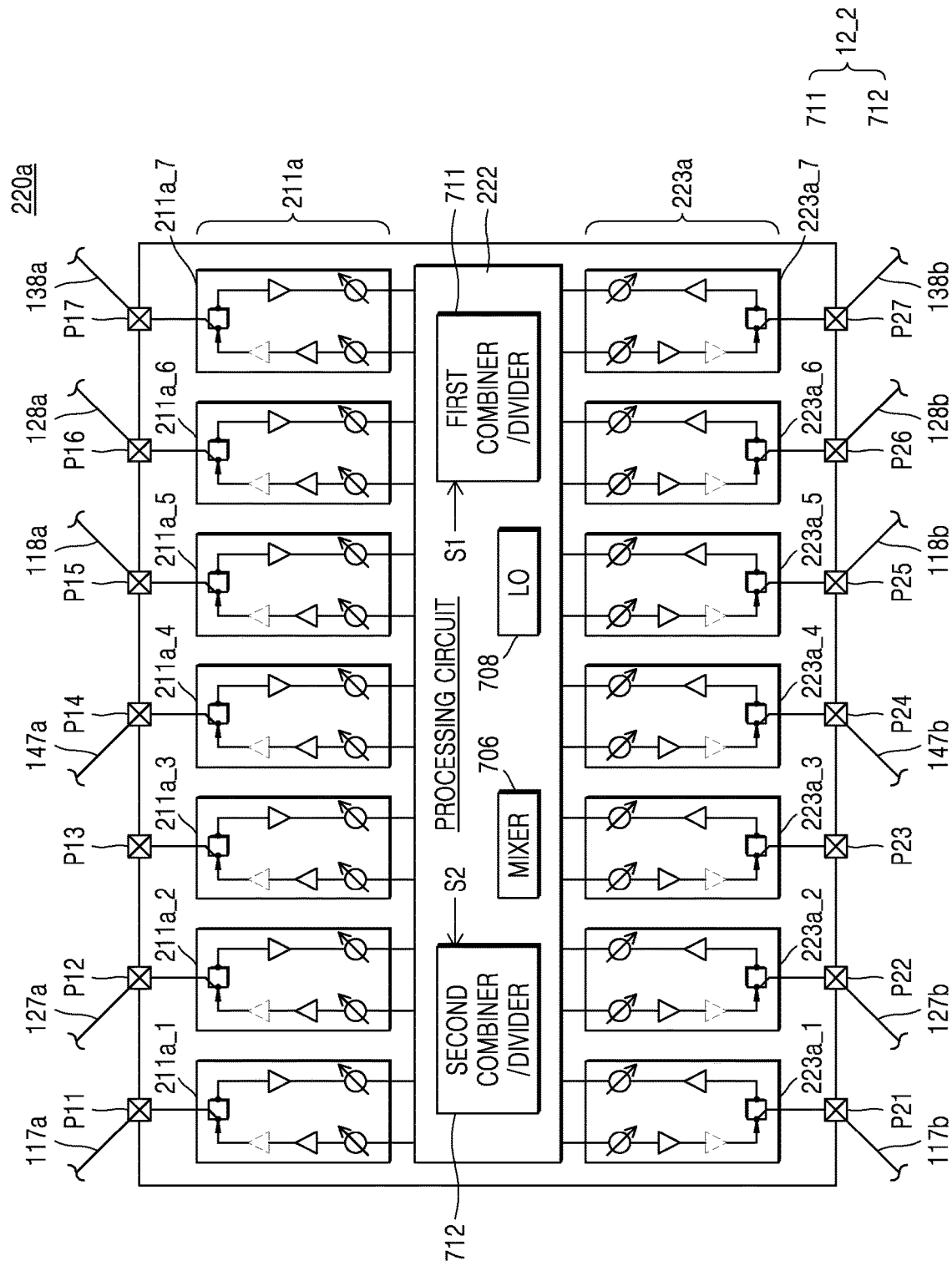
FIG. 7 is a circuit diagram illustrating the configuration of an RF circuit when the antenna array according to the embodiment of FIG. 3A is mounted on an antenna module.
Figure 8:
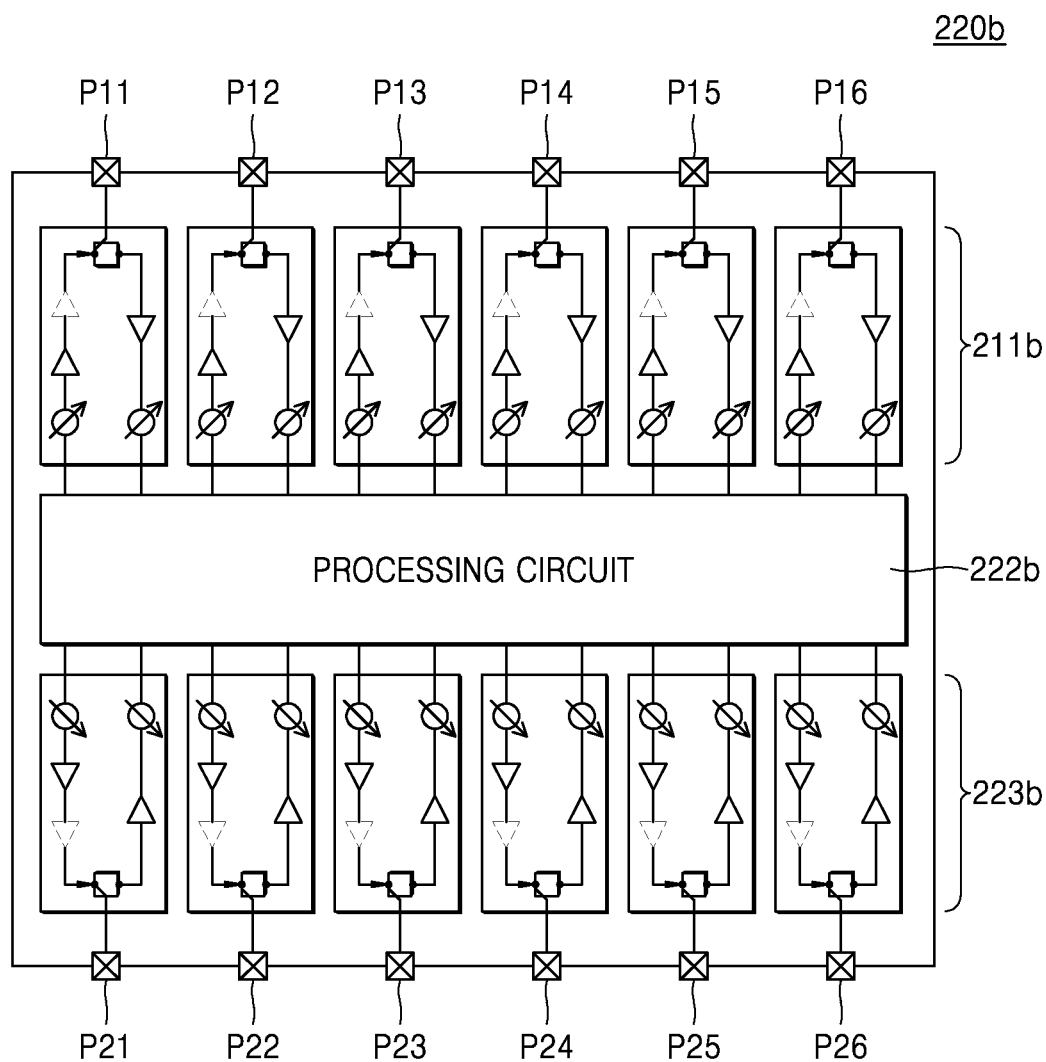
FIG. 8 is a circuit diagram illustrating the configuration of an RF circuit when the antenna array according to the embodiment of FIG. 4 is mounted on an antenna module.

FIG. 7 is a circuit diagram illustrating the configuration of an RF circuit 220a when the antenna array structure 11a according to the embodiment of FIG. 3A is included in the antenna module 10, and FIG. 8 is a circuit diagram illustrating the configuration of an RF circuit 220b when the antenna array structure 11b according to the embodiment of FIG. 4 is included in the antenna module 10.

As an example, FIG. 7 shows a block diagram of an RF circuit 220a including 14 transmission circuits and 14 reception circuits corresponding to the embodiment of FIG. 3A, and FIG. 8 shows an example of a block diagram of an RF circuit 220b including 12 transmission circuits and 12 reception circuits corresponding to the embodiment of FIG. 4.

Referring to FIG. 7, the RF circuit 220a may include seven first transmission and reception circuits (or T/R sub-circuits) 211a (e.g., T/R sub-circuits 211a_1 to 211a_7), seven second transmission and reception circuits (or T/R sub-circuits) 223a (e.g., T/R sub-circuits 223a_1 to 223a_7) and a processing circuit 222. The first transmission and reception circuits 211a may be connected to each of the seven connection points P11 to P17 for connecting to the antennas, and the second transmission and reception circuits 223a may also be connected to each of the seven connection points P21 to P27 for connecting to the antennas. The processing circuit 222 may be connected to the first transmission and reception (T/R) circuits 211a and the second transmission and reception (T/R) circuits 223a, and may include switches, a combiner/divider network 12_2, a mixer 706, an LO generator 708, and the like. As indicated by the dotted line in FIGS. 7 and 8, some active elements included in the transmission circuit may be omitted in the RF circuits 220a and 220b, and the RF circuits 220a and 220b may be connected to an active element array including the omitted active elements. Referring to FIG. 8, the RF circuit 220b may include six first transmission and reception circuits 211b, six second transmission and reception circuits 223b, and a processing circuit 222b.

According to an embodiment, each of the first transmission and reception circuits and the second transmission and reception circuits may be connected to each of the antennas through respective connection points. Referring to FIGS. 3A and 7, first transmission and reception circuits may be connected to seven antennas included in the antenna array structure 11 through seven connection points P11 to P17. In addition, the second transmission and reception circuits may be connected to seven antennas included in the antenna array structure 11 through seven connection points P21 to P27. Referring to FIGS. 4 and 8, first transmission and reception circuits may be connected to six antennas included in the antenna array structure 11 through six connection points P11 to P16 and second transmission and reception circuits may be connected to six antennas included in the antenna array structure 11 through six connection points P21 to For example, the combiner/divider network 12_2 may include a first combiner/divider 711 and a second combiner/divider 712, which respectively receive a first RF signal S1 at a first frequency and a second RF signal S2 at a second frequency, in a transmission ("on transmit"). The first combiner/divider 711 may divide the signal S1 into three divided signals, which are respectively output to T/R sub-circuits 211a_5, 211a_6 and 211a_7. The output signals of these circuits are then applied to probe feeds 118a, 128a and 138a, respectively, for transmission through a respective antenna elements 101_2, 101_1 and 101_3 at a first polarization (see FIG. 3B). These antenna elements may form a beam with the first signal at the first polarization. On transmit, the first combiner/divider 711 may receive a further input signal (not shown) at the first frequency, divide the same into three divided signals which are output to probe feeds 118b, 128b and 138b, respectively, for connection to antenna elements 101_2, 101_1 and 101_3, respectively, to produce a further beam at a second polarization. Reciprocal signal flow may be provided in the receive paths, in which receive signals from the first antenna elements 101 are routed through the T/R sub-circuits 211a_5 to 211a_7 and through the first combiner/divider 711 to output a combined receive path signal (not shown).

In a similar manner, on transmit, a second RF signal S2 may be applied to the second combiner/divider 712 and divided into four divided transmit signals. These signals may be applied to T/R sub-circuits 211a_1 through 211a_4, which process the divided signals (e.g., amplify and phase shift) and output the processed signals to probe feeds 117a, 127a, 147a, etc., for transmission through respective antenna elements 102_1 through 102_4 at a third polarization (e.g., the same as or different from the first polarization). Another RF input signal (not shown) may also be applied to the second combiner/divider 712, where it is divided and output to probe feeds 117b, 127b, 147b, etc., and then routed to T/R sub-circuits 223a_1 to 223a_4 and respective antenna elements 102 in a similar manner, to generate a fourth beam at a fourth polarization (e.g., the same as the second polarization).

Analogous operations may be performed by the circuitry of FIG. 8 in conjunction with the antenna array structure 11b of FIG. 4. In other embodiments, a different connection arrangement between a combiner/divider network 12_2 and the antenna elements is implemented in the configurations of FIGS. 7 and 8, e.g., for spatial diversity or the like.

Figure 9:
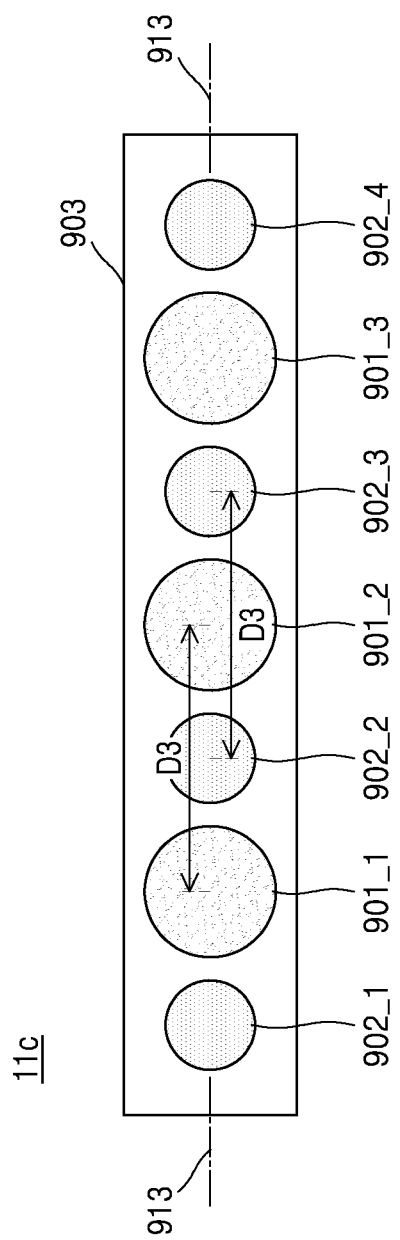
FIGS. 9 and 10 are plan views of antenna array structures in which respective antennas are spaced apart by the same distance according to embodiments.
Figure 10:
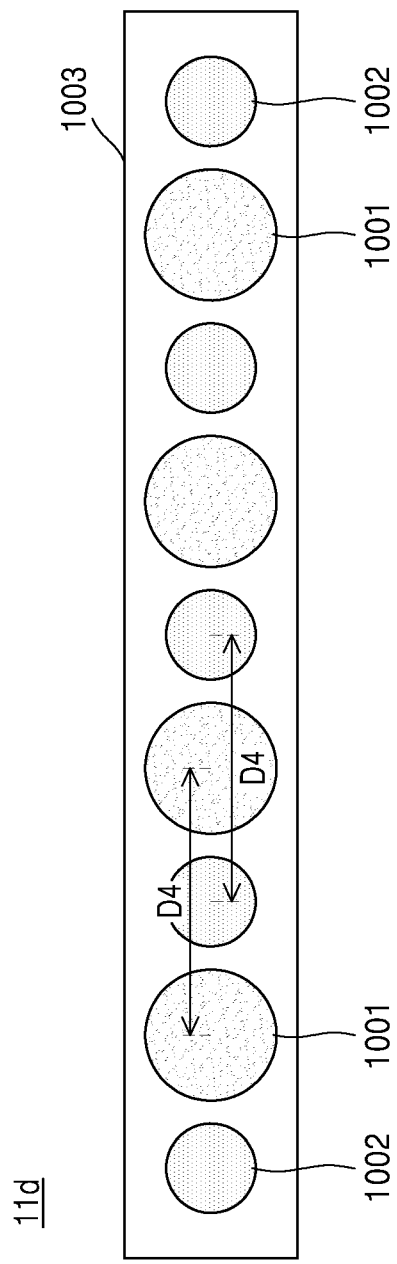

FIGS. 9 and 10 are example plan views illustrating antenna array structures in which respective antennas are arranged spaced apart by the same distance according to embodiments.

Referring to FIG. 9, in an antenna array structure 11c according to an example embodiment, the first antennas and the second antennas may be arranged alternately and aligned to a line 913 (as viewed in a plan view, e.g., a point above the antenna array structure 11c) to form a pair of linear arrays. For example, three first antennas 901 (e.g., 901_1, 901_2 and 901_3) and four second antennas 902 (e.g., 902_1, 901_2, 902_3 and 902_4) may be alternately disposed and aligned to line 913 and spaced over a ground plane 903. In this case, a distance D3 (inter-element spacing) between the first antennas 901 and a distance D3 between the second antennas 902 may be the same. A first linear array may be formed by the first antennas 901 and form a first beam and a second linear array may be formed by the second antennas 902 and form a second beam. For example, when the first antennas 901 transmit/receive a signal at 28 GHz (or within a first frequency band centered around 28 GHz) and the second antennas 902 transmit/receive a signal at 39 GHz (or within a second frequency band centered around 39 GHz), distance D3, which is the inter-element spacing between the first antennas 901 and between the second antennas 902, may be about 5.8 mm. The distance D3 may be a distance obtained by multiplying a wavelength at 28 GHz, which may be the communication frequency of the first antennas, by 0.52, and may be a distance obtained by multiplying a wavelength at 39 GHz, which may be a communication frequency of the second antennas, by 0.77.

Referring to FIG. 10, an antenna array structure 11d may have a higher signal gain as more antennas are alternately disposed in the antenna array structure 11 having a larger form factor (larger aperture) compared to the embodiment of FIG. 9. In this case, the distance at which the first antenna and the second antenna are spaced apart may be the same, and for example, the fourth distance D4 at which the antennas of the same type are spaced apart may be about 5.8 mm.

In either of the antenna array structures 11c and 11d of FIGS. 9 and 10, the first antennas 901 or 1001 may be situated at the same level (spaced from the ground plane 903 or 1003 by the same distance) as the second antennas 902 or 1002. In other embodiments, the first antennas 901 or 1001 are situated at a different level than the second antennas 902 or 1002. Each of the second antennas 902 and 1002 may have an aperture size larger than at least one aperture size of the first antennas 901 or 1001. For instance, each of the first antennas 901 and 1001 may have the same first aperture size and each of the second antennas 902 and 1002 may have the same second aperture size. A transmitter and/or a receiver (e.g., the transceiver 12 of FIG. 2) may be configured to output first signals at the first frequency and/or receive the first signals to/from the first antennas 901 or 1001, and to output second signals and/or receive the second signals to/from the second antennas 902 or 1002.

Figure 11:
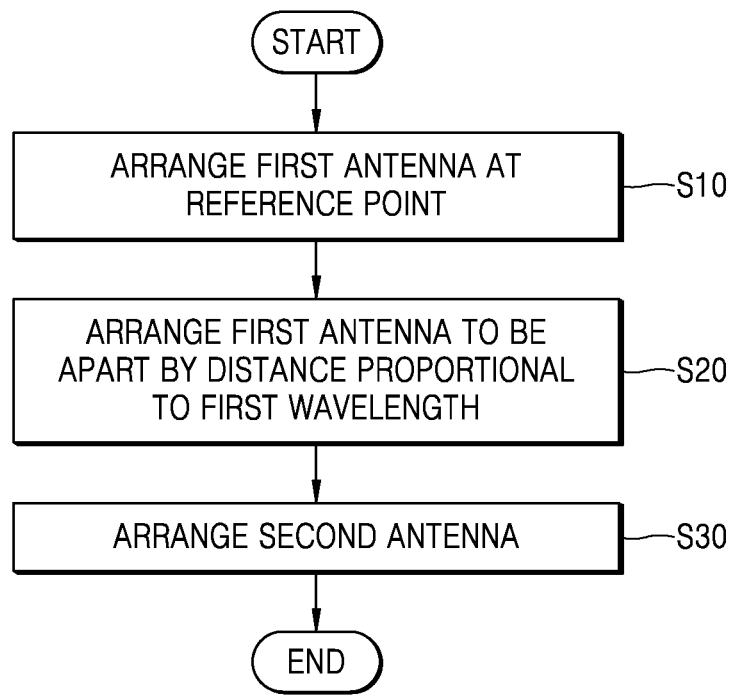
FIG. 11 is a flowchart illustrating a method of arranging a first antenna and a second antenna in an antenna module according to an embodiment.

FIG. 11 is a flowchart illustrating a method in which a first antenna and a second antenna are disposed in the antenna module 10 according to an embodiment.

Referring to FIG. 11, after the first antenna is disposed at the reference point of the antenna array structure 11, a plurality of first antennas may be disposed based on the first antenna disposed at the reference point, and second antennas may be disposed according to the locations of the disposed first antennas.

In operation S10, one first antenna may be disposed at a reference point of the antenna array structure 11. The reference point may be the center of the antenna array structure 11, but the reference point of the present disclosure is not limited thereto, and may be a reference point so that a plurality of antennas are symmetrically disposed in the antenna array structure 11.

After the first antenna is disposed as the reference antenna at the reference point, in operation S20, the first antenna may be disposed to be spaced apart from the reference antenna by a distance proportional to the first wavelength. According to an embodiment, the distance proportional to the first wavelength may be a distance obtained by multiplying the first wavelength by a predefined weight, and the predefined weight may be a ratio of a separation distance to a wavelength determined according to the graph of FIG. 5.

For example, when the first antenna is an antenna that communicates at 28 GHz, which is the center frequency of the low frequency band, a distance at which the first antenna is spaced apart from the reference antenna may be a distance obtained by multiplying a wavelength for 28 GHz by a predefined weight of 0.65, and in this case, the distance may be about 7.2 mm.

After all of the first antennas are disposed in the antenna array structure 11, in operation S30, a plurality of second antennas may be disposed. According to one embodiment, the second antenna may be disposed overlapping the reference antenna, and according to another embodiment, the second antenna may be disposed around the reference antenna. Hereinafter, a method of arranging the second antenna according to different embodiments will be described with reference to FIGS. 12 and 13.

Figure 12:
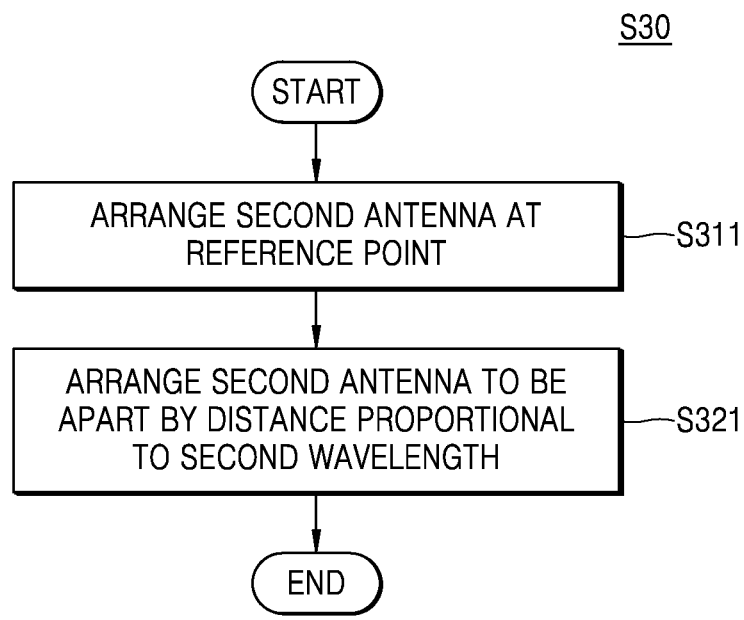
FIGS. 12 and 13 are flowcharts illustrating a method of arranging a second antenna in an antenna module according to different embodiments.
Figure 13:
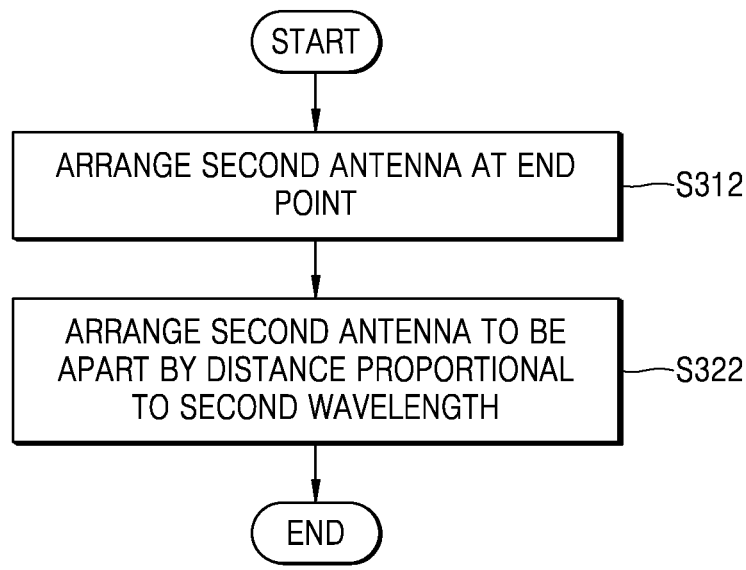

FIGS. 12 and 13 are flowcharts illustrating a method in which a second antenna is disposed in the antenna module 10 according to different embodiments.

Referring to FIGS. 12 and 13, first antennas may be disposed, and second antennas may be disposed according to points at which the first antennas are disposed. For example, according to FIG. 12, the second antenna may be disposed overlapping the first antenna disposed at the reference point, and referring to FIG. 13, second antennas may be disposed overlapping the first antennas disposed at both end points.

In operation S311 of FIG. 12, one second antenna may be disposed overlapping the first antenna at the reference point. For example, the second antenna may be disposed above the first antenna, but is not limited thereto, and the second antenna may be disposed below the first antenna. An antenna group in which the first antenna and the second antenna are overlapped may be referred to as a stacked antenna group 110.

In operation S321, the plurality of second antennas may be disposed to be spaced apart from the reference point by a distance proportional to the second wavelength. According to an embodiment, the distance proportional to the second wavelength may be a distance obtained by multiplying the second wavelength by a predefined weight, and the predefined weight may be a ratio of a distance to a wavelength determined according to the graph of FIG. 5.

For example, when the second antenna is an antenna that communicates at 39 GHz, which is the center frequency of the high frequency band, a distance at which the second antenna is spaced apart from the reference antenna may be a distance obtained by multiplying a wavelength for 39 GHz by a predefined weight of 0.65, and in this case, the distance may be about 5 mm.

According to embodiments of FIGS. 11 and 12, the first antennas spaced apart from the reference point by a first distance and the second antennas spaced apart by a second distance from the reference point may be formed as an interleaved antenna group 120. The antenna array structure 11 arranged by the arrangement method of FIG. 12 may be the same as that of the embodiment of FIG. 4.

In operation S312 of another embodiment of FIG. 13, second antennas may be disposed at both end points of the antenna array structure 11. In this case, both end points may be points at which the first antenna is spaced apart from the reference antenna by a first distance in the outer direction of the antenna array structure 11 in FIG. 11. Accordingly, the first antennas and the second antennas may be disposed overlapping each other at both end points. For example, the second antenna may be disposed above the first antenna at both end points of the antenna array structure 11, but is not limited thereto, and the second antenna may be disposed under the first antenna. An antenna group in which the first antenna and the second antenna are overlapped may be referred to as a stacked antenna group 110.

In operation S322, the second antennas may be disposed to be spaced apart from the second antennas disposed at both end points by a distance proportional to the second wavelength toward the reference point. According to an embodiment, the distance proportional to the second wavelength may be a distance obtained by multiplying the second wavelength by a predefined weight, and the predefined weight may be a ratio of a distance to a wavelength determined according to the graph of FIG. 5.

With respect to the second antennas disposed at both end points, the second antennas spaced apart toward the reference point and the first antenna disposed at the reference point may be formed as one interleaved antenna group 120. The antenna array structure 11 arranged by the arrangement method of FIG. 13 may be the same as that of the embodiment of FIG. 3A.

In the arrangement method of FIGS. 11 to 13, a plurality of antennas may be disposed in the order described above, but the embodiment of the present disclosure is not limited thereto, and after the plurality of first antennas are disposed simultaneously, the plurality of second antennas may be disposed.

Figure 14:
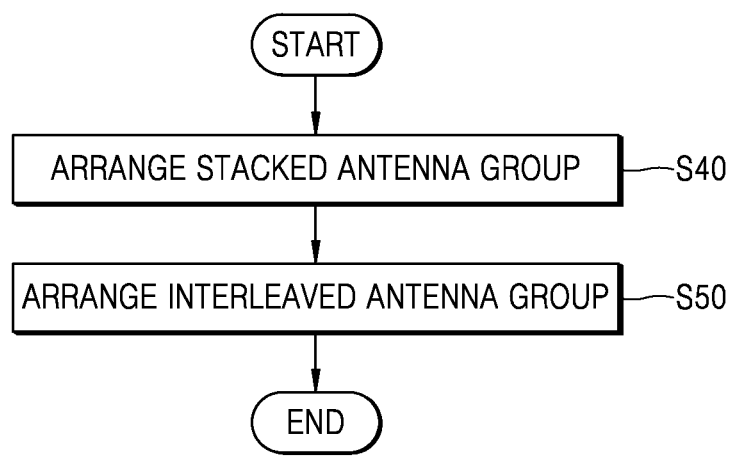
FIG. 14 is a flowchart illustrating a method of arranging a stacked antenna group and an interleaved antenna group according to an embodiment of the present disclosure.

FIG. 14 is a flowchart illustrating a method of arranging the stacked antenna group 110 and the interleaved antenna group 120 according to an embodiment of the present disclosure.

Referring to FIG. 14, a plurality of antennas may be disposed in the antenna module 10 for each antenna group. According to one embodiment, the stacked antenna group 110 may be disposed at the reference point, but according to another embodiment, the interleaved antenna group 120 may be disposed at the reference point.

In operation S40, a stacked antenna group 110 may be disposed on the antenna module 10. According to the embodiment of FIG. 3A, the stacked antenna groups 110 configured by overlapping one first antenna and one second antenna at both end points may be disposed, and according to the embodiment of FIG. 4, the stacked antenna group 110 may be disposed at a reference point.

In operation S50, the interleaved antenna group 120 may be disposed in the antenna module 10. According to the embodiment of FIG. 3A, the interleaved antenna group 120 including one first antenna and two second antennas disposed on both sides of one first antenna may be disposed. At this time, the first antenna included in the interleaved antenna group 120 may be disposed at a reference point spaced apart by a first distance from both end points in the reference point direction, and the second antennas included in the interleaved antenna group 120 may be disposed at points spaced apart by a second distance from both end points in the direction of the reference point.

According to the embodiment of FIG. 4, in another embodiment, two interleaved antenna groups 120 including one first antenna and one second antenna may be disposed on both sides of the stacked antenna group 110 disposed at the reference point. At this time, the first antennas disposed on both sides of the first antenna disposed at the reference point may be disposed to be spaced apart by a first distance, and the second antennas disposed on both sides of the second antenna disposed at the reference point may be disposed to be spaced apart by a second distance.

In the antenna array structure 11 of the present disclosure, the stacked antenna group 110 and the interleaved antenna group 120 may be disposed in order according to FIG. 14, but is not limited thereto, and after the interleaved antenna group 120 is disposed, the stacked antenna group 110 may be disposed, and the stacked antenna group 110 and the interleaved antenna group 120 may be disposed at the same time.

Figure 15:
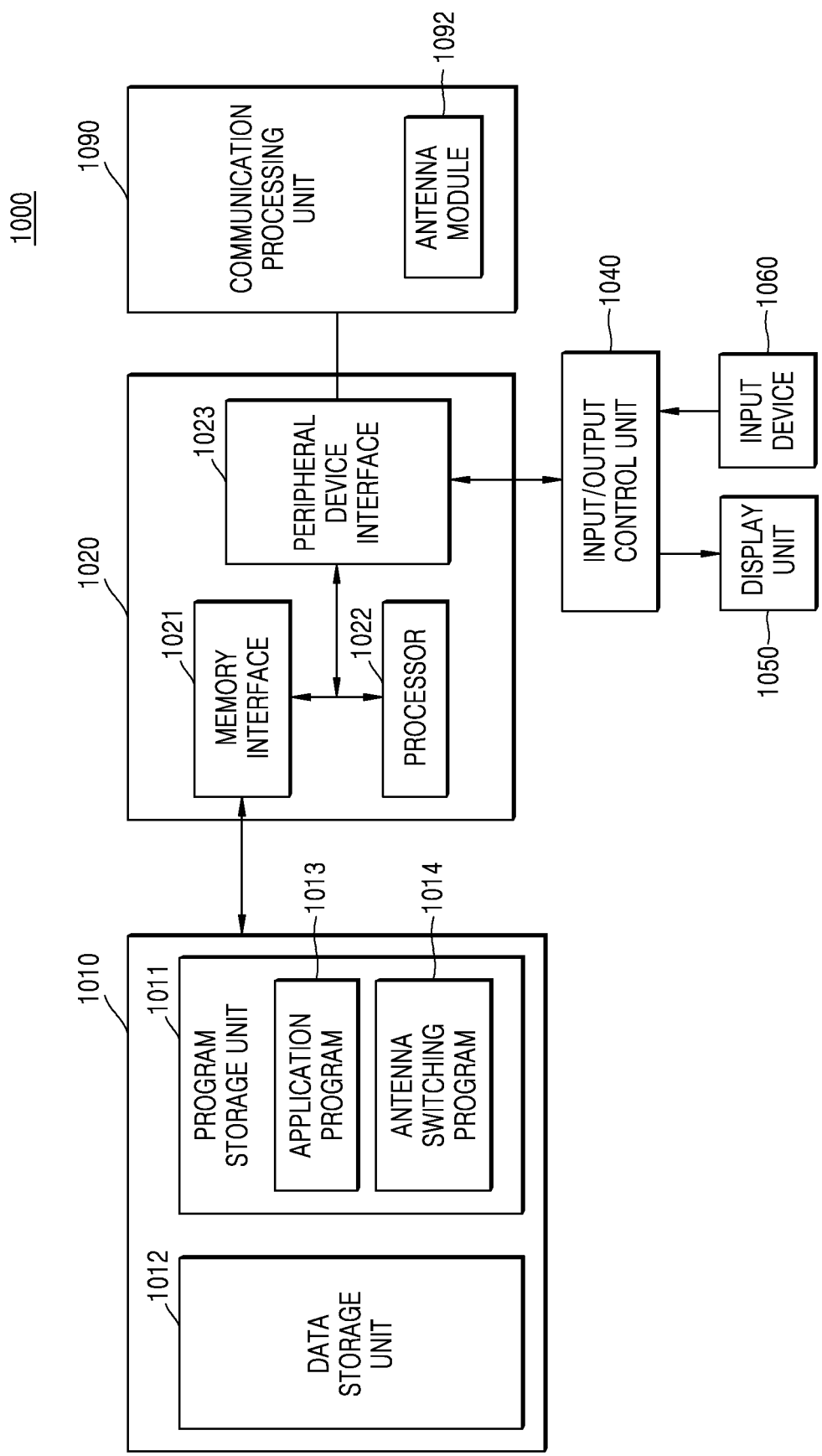
FIG. 15 is a block diagram illustrating an electronic device according to an example embodiment of the present disclosure.

FIG. 15 is a block diagram illustrating an electronic device according to an example embodiment of the present disclosure.

Referring to FIG. 15, the electronic device 1000 may include a memory 1010, a processor unit 1020, an input/output control unit 1040, a display unit 1050, an input device 1060, and a communication processing unit 1090. Here, a plurality of memories 1010 may exist. Some examples of each component is as follows.

The memory 1010 may include a program storage unit 1011 for storing a program for controlling the operation of the electronic device, and a data storage unit 1012 for storing data generated during program execution. The data storage unit 1012 may store data required for the operation of the application program 1013 and the antenna switching program 1014. The program storage unit 1011 may include an application program 1013 and an antenna switching program 1014. Here, the program included in the program storage unit 1011 may be expressed as an instruction set as a set of instructions.

The application program 1013 includes an application program operating in the electronic device. That is, the application program 1013 may include instructions of an application driven by the processor 1022. The antenna switching program 1014 may perform a switching operation for antennas allocated to a plurality of frequency bands according to an embodiment. For example, when the requested frequency band is a low frequency band, the antenna switching program 1014 may select the first antennas and, when the requested frequency band is a high frequency band, may select the second antennas.

The peripheral device interface 1023 may control the connection between the input/output peripheral device of the BS and the processor 1022 and the memory interface 1021. The processor 1022 controls the BS to provide a corresponding service using at least one software program. In this case, the processor 1022 may execute at least one program stored in the memory 1010 to provide a service corresponding to the program.

The input/output control unit 1040 may provide an interface between an input/output device such as the display unit 1050 and the input device 1060 and the peripheral device interface 1023. The display unit 1050 displays state information, input characters, moving pictures, and still pictures. For example, the display unit 1050 may display application program information driven by the processor 1022.

The input device 1060 may provide input data generated by selection of the electronic device to the processor unit 1020 through the input/output control unit 1040. In this case, the input device 1060 may include a keypad including at least one hardware button and a touch pad for sensing touch information. For example, the input device 1060 may provide touch information, such as a touch sensed through a touch pad, a touch movement, and a touch release, to the processor 1022 through the input/output controller 1040. The electronic device 1000 may include a communication processing unit 1090 that performs communication functions for voice communication and data communication. The communication processing unit 1090 may include an antenna module 1092 for supporting communication in a millimeter wave band according to example embodiments of the present disclosure.

The antenna array structure included in the antenna module 1092 may be any of the antenna array structures described above, and may include first antennas and second antennas, and exemplarily, the first antennas may transmit/receive a signal of a low frequency band, and the second antennas may transmit/receive a signal of a high frequency band. In this case, the antenna array structure may be divided into a stacked antenna group and an interleaved antenna group, and the stacked antenna group and the interleaved antenna group may be alternately disposed.

Figure 16:
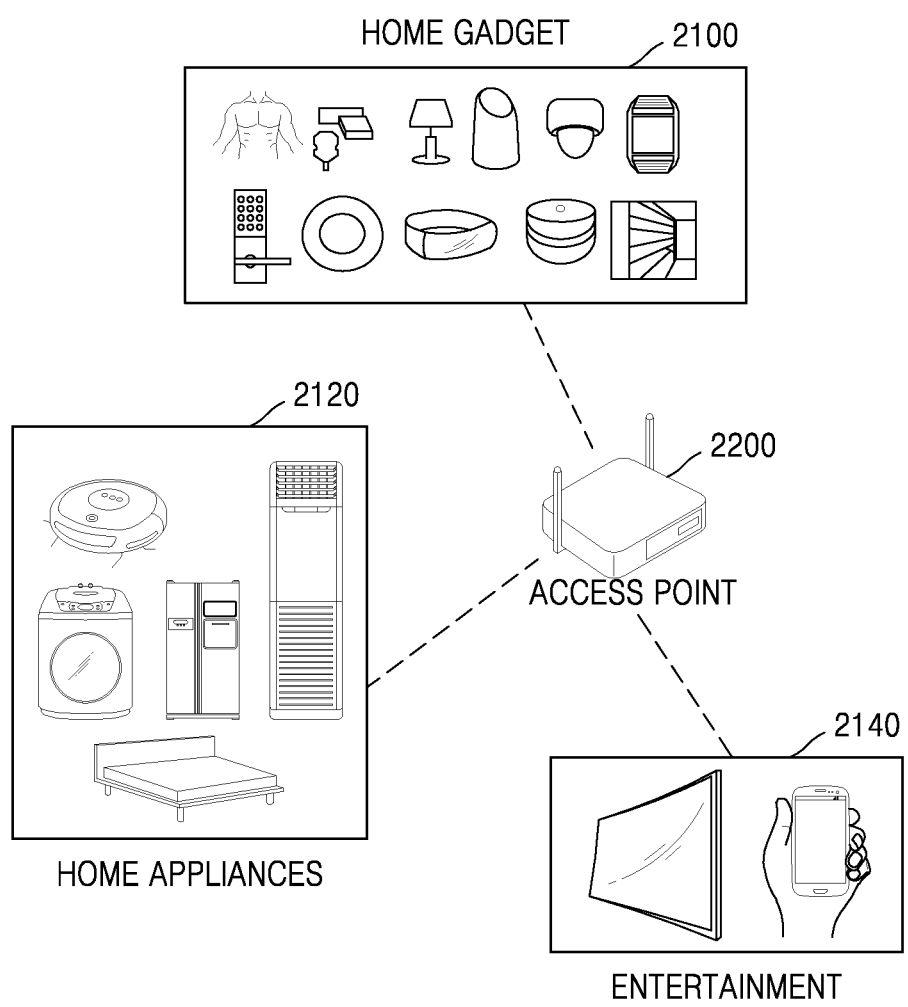
FIG. 16 is a diagram illustrating communication devices including a plurality of antenna modules according to an example embodiment of the present disclosure.

FIG. 16 is a diagram illustrating communication devices including a plurality of antenna modules according to an example embodiment of the present disclosure.

Referring to FIG. 16, a home gadget 2100, home appliances 2120, an entertainment device 2140, and an access point (AP) 2200 may perform each of antenna module selection and antenna module switching operations according to embodiments of the present disclosure. In some embodiments, the home gadget 2100, the home appliances 2120, the entertainment device 2140, and the AP 2200 may constitute an Internet of Things (IoT) network system. It will be understood that the communication devices shown in FIG. 19 are only examples, and the embodiment according to the example embodiment of the present disclosure may be applied to other communication devices not shown in FIG. 16.

While the inventive concept has been particularly shown and described with reference to embodiments thereof, it will be understood that various changes in form and details may be made therein without departing from the spirit and scope of the following claims.

What is claimed is:

1. An antenna array structure comprising:
a plurality of first antenna elements for transmitting and/or receiving a signal at a first frequency and a plurality of second antenna elements for transmitting and/or receiving a signal at a second frequency different from the first frequency,
wherein the plurality of first antenna elements are disposed in a first layer, and aligned, as viewed from a point above the antenna array structure, to a line extending in a first direction and the plurality of second antenna elements are disposed in a second layer and aligned, as viewed from the point above the antenna array structure, to the line,
wherein a first distance between two adjacent first antenna elements is different from a second distance between two adjacent second antenna elements,
wherein in a direction orthogonal to a major surface of a said first antenna element, a centrally located one of the first antenna elements overlaps a centrally located one of the second antenna elements, and
wherein a number of the plurality of first antenna elements equals a number of the plurality of second antenna elements.

2. The antenna array structure of claim 1, wherein the first distance is determined based on a product of a wavelength at the first frequency and a weight.

3. The antenna array structure of claim 2, wherein the second distance is determined based on a product of a wavelength at the second frequency and the weight.

4. The antenna array structure of claim 1, wherein the first distance and the second distance are determined based on a ratio of a reciprocal number of the first frequency to a reciprocal number of the second frequency.

5. The antenna array structure of claim 1, wherein the first frequency is less than the second frequency,
wherein one first antenna element is disposed between two adjacent second antenna elements.

6. The antenna array structure of claim 5, wherein two other first antenna elements adjacent to the one first antenna element overlap two respective second antenna elements in a second direction perpendicular to the first direction.

7. The antenna array structure of claim 1, wherein the first frequency is less than the second frequency,
wherein one first antenna element overlaps one second antenna element in a second direction perpendicular to the first direction,
wherein two other first antenna elements adjacent to the one first antenna element do not overlap any of the plurality of second antenna elements.

8. An antenna module comprising:
an antenna array structure including a plurality of antenna elements, the plurality of antenna elements including a plurality of first antenna elements for transmitting and receiving signals within a first frequency band and a plurality of second antenna elements for transmitting and receiving signals within a second frequency band higher than the first frequency band; and
a transceiver configured to provide and receive the signals to and from the plurality of antenna elements,
wherein the antenna array structure comprises:
at least one stacked antenna group each including one first antenna element overlapping one second antenna element in a first direction orthogonal to a major surface of the second antenna element; and
an interleaved antenna group including at least one first antenna element adjacent to the one first antenna element in a second direction orthogonal to the first direction and at least one second antenna element adjacent to the one second antenna element in the second direction, wherein the at least one first antenna element does not overlap the at least one second antenna element in the first direction,
wherein the interleaved antenna group is centrally located between a first end of the antenna module and a second end of the antenna module in the second direction, and a number of the plurality of first antenna elements is one less than a number of the plurality of second antenna elements.

9. The antenna module of claim 8, wherein the transceiver comprises:
a transmission and reception circuit configured to generate a transmission signal in response to a request from a communication device, provide the generated transmission signal to the antenna array structure, and receive a reception signal from the antenna array structure; and
a Power Management Integrated Circuit (PMIC) configured to supply power to elements included in the antenna module.

10. The antenna module of claim 8, wherein a first distance between two adjacent first antenna elements is determined based on a product of a wavelength at a frequency within the first frequency band and a weight.

11. The antenna module of claim 10, wherein a second distance between two adjacent second antenna elements is determined based on a product of a wavelength at a frequency within the second frequency band and the weight.

12. The antenna module of claim 8, wherein a first distance between two adjacent first antenna elements and a second distance between two adjacent second antenna elements are determined based on a ratio of a reciprocal number of a frequency within the first frequency band to a reciprocal number of a frequency within the second frequency band.

13. The antenna module of claim 8,
wherein the interleaved antenna group comprises a first antenna element and at least two second antenna elements which do not overlap each other.

14. The antenna module of claim 8,
wherein two stacked antenna groups are disposed on opposite sides of the interleaved antenna group.

15. A method of arranging an antenna array structure including a plurality of first antenna elements and a plurality of second antenna elements, the method comprising:
arranging one of the first antenna elements for transmitting and/or receiving a signal at a first frequency at a reference point as a reference antenna element;
arranging a further one of the first antenna elements apart from the reference antenna element by a first distance proportional to a first wavelength at the first frequency; and
arranging the plurality of second antenna elements for transmitting and/or receiving a signal at a second frequency different from the first frequency by separating the plurality of second antenna elements from each other by a second distance proportional to a second wavelength at the second frequency and equal to the first distance, wherein the first antenna elements and the second antenna elements are arranged alternatingly along a common line.

16. The method of claim 15, wherein the arranging the further first antenna element comprises arranging the further first antenna element to be spaced apart by a distance obtained by multiplying the first wavelength by a weight, wherein the arranging the plurality of second antenna elements comprises arranging the plurality of second antenna elements to be spaced apart from each other by a distance obtained by multiplying the second wavelength by the weight.

17. The method of claim 15, wherein the arranging of the plurality of second antenna elements comprises:

arranging one of the second antenna elements at the reference point to overlap the reference antenna element; and arranging another of the second antenna elements spaced apart based on the reference antenna element.

18. The method of claim 15, wherein the arranging of the plurality of second antenna elements comprises:

arranging one of the second antenna elements at an end point of the antenna array structure on which the first antenna element is arranged; and arranging a further one of the second antenna elements to be spaced apart from the end point.

19. The method of claim 18, wherein the arranging of the further second antenna element comprises arranging at least two second antenna elements around the reference antenna element.

* * * * *